United States Patent [19]

Takabayashi

[11] Patent Number: 5,043,570
[45] Date of Patent: Aug. 27, 1991

[54] HIGH RESOLUTION MICROSCOPING SYSTEM USING CONVOLUTION INTEGRATION PROCESS

[75] Inventor: Hitoshi Takabayashi, Tokyo, Japan

[73] Assignee: Anritsu Corporation, Tokyo, Japan

[21] Appl. No.: 550,971

[22] Filed: Jul. 10, 1990

[30] Foreign Application Priority Data

Jul. 13, 1989 [JP] Japan .................................. 1-180700

[51] Int. Cl.$^5$ .............................................. H01J 3/14
[52] U.S. Cl. ...................................... 250/216; 359/368
[58] Field of Search ....................... 250/216, 201.3, 234, 250/507, 531

[56] References Cited

U.S. PATENT DOCUMENTS

| | | |
|---|---|---|
| 4,733,063 | 3/1988 | Kimura et al. |
| 4,769,698 | 9/1988 | Ledley et al. ........................ 350/531 |
| 4,824,229 | 4/1989 | Narita et al. ........................ 350/507 |

OTHER PUBLICATIONS

Image Recovery: Theory and Application; Academic Press, Inc.; H. Stark pp. V–IX.
The Bell System Technical Journal; Jan. 1961; D. Slepian & H. O. Pollak pp. 43–63.
IEEE Transactions on Circuits and Systems, vol. Cas-25; No. 9, Sep. 1978; pp. 694–702.

Primary Examiner—David C. Nelms
Assistant Examiner—K. Shami
Attorney, Agent, or Firm—Frishauf, Holtz, Goodman & Woodward

[57] ABSTRACT

An optical system including a wave source radiates a converging wave to an object. A first memory stores a function g (x,y) representing the intensity distribution of the converging wave at a substantially beam waist section thereof. A scanning system directs the converging wave on the object at a substantially beam waist position, and operates so as to scan the converging wave on the object. A detector detects the intensity of a secondary wave generated by interaction between the converging wave and the object in accordance with a scanning operation of the scanning means. A second memory stores a positional function I (x,y) representing the intensity distribution of the secondary wave detected by the detector. In order to obtain a sensitivity distribution representing the intensity of the interaction between the object and the converging wave, an arithmetic unit obtains a function f (x,y) such that the function I(x,y)·stored in the second memory satisfies convolution integration of the function g (x,y) stored in the first memory, and the function f(x,y).

12 Claims, 11 Drawing Sheets

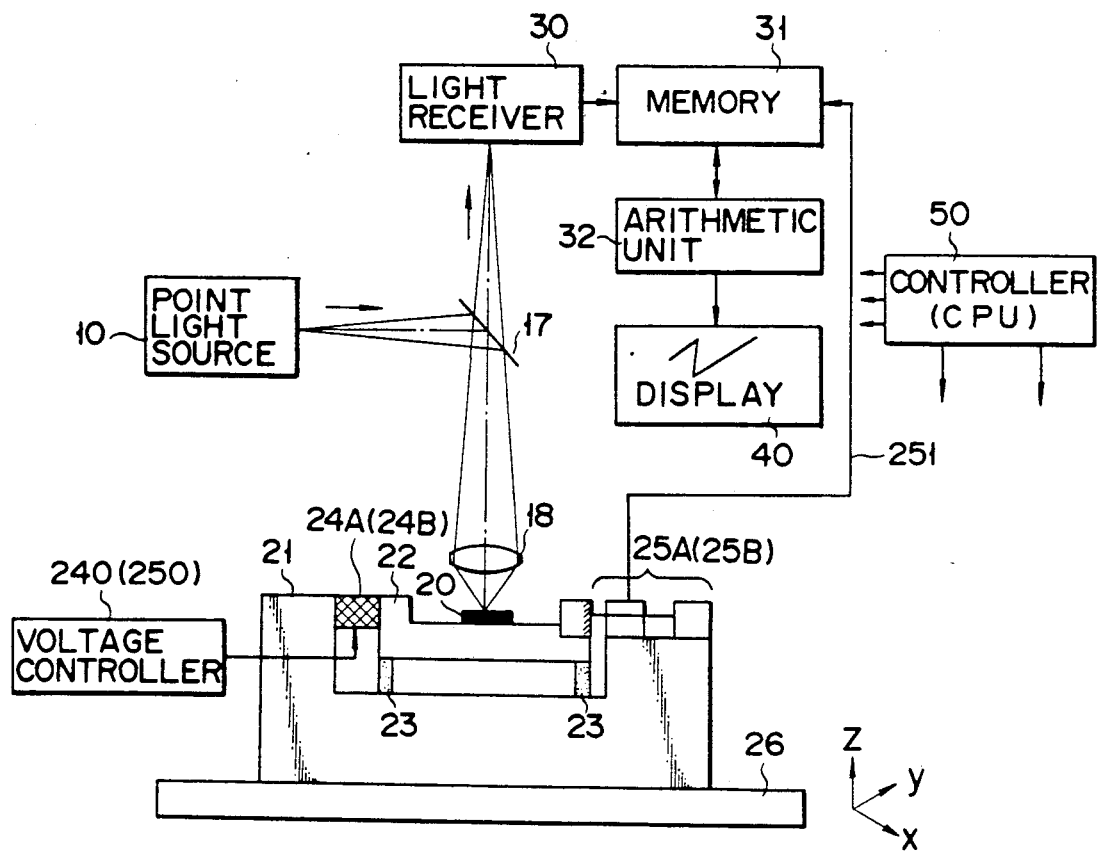
F I G. 5
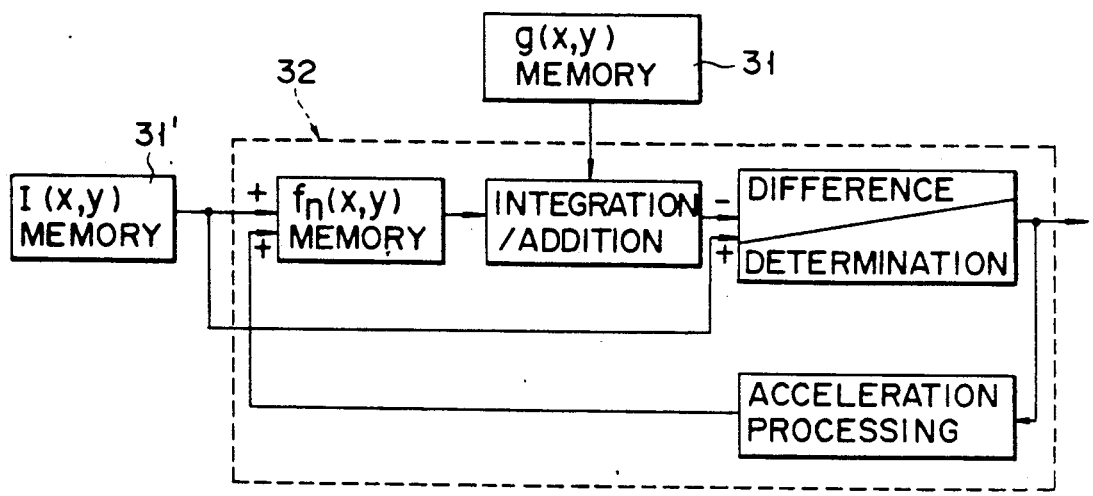
F I G. 6A

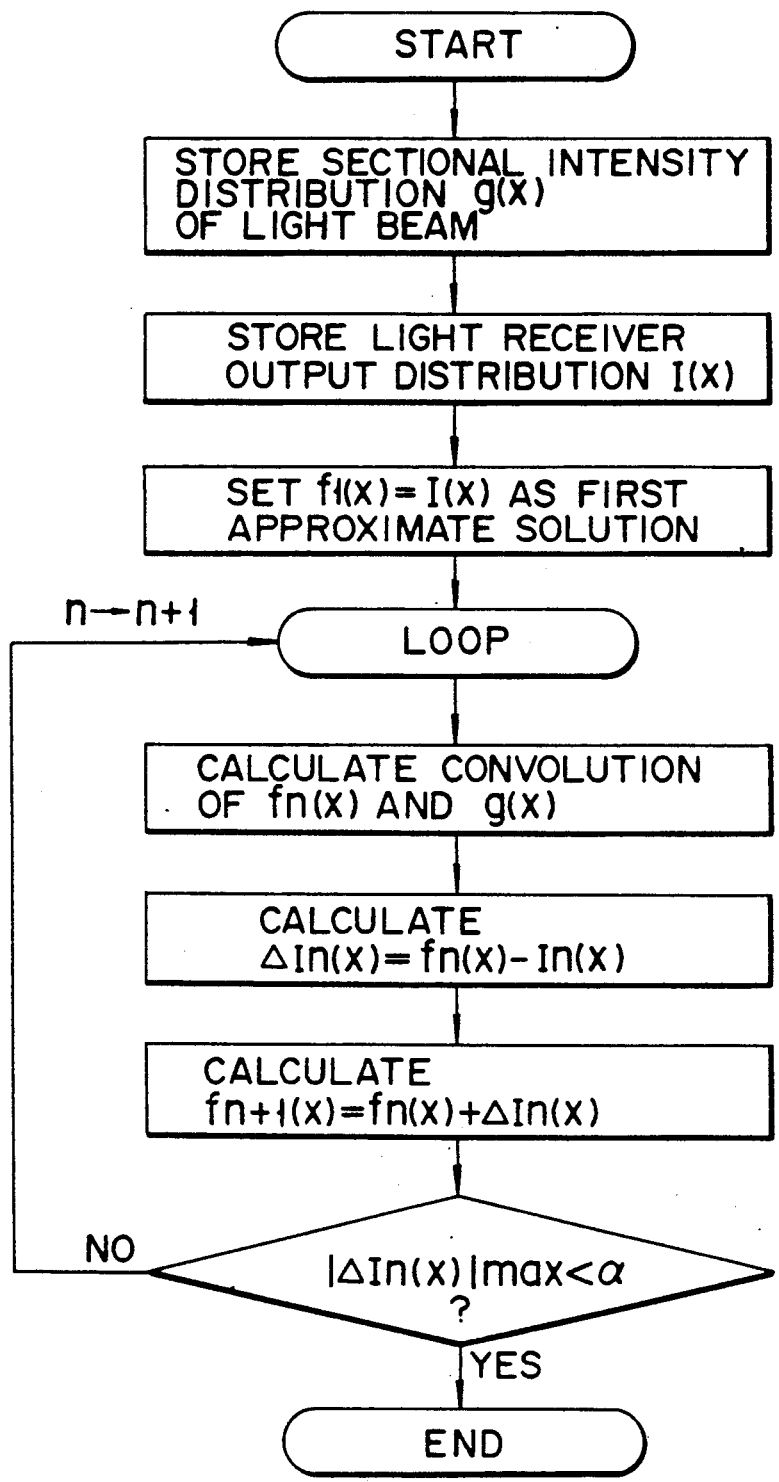
F I G. 6B

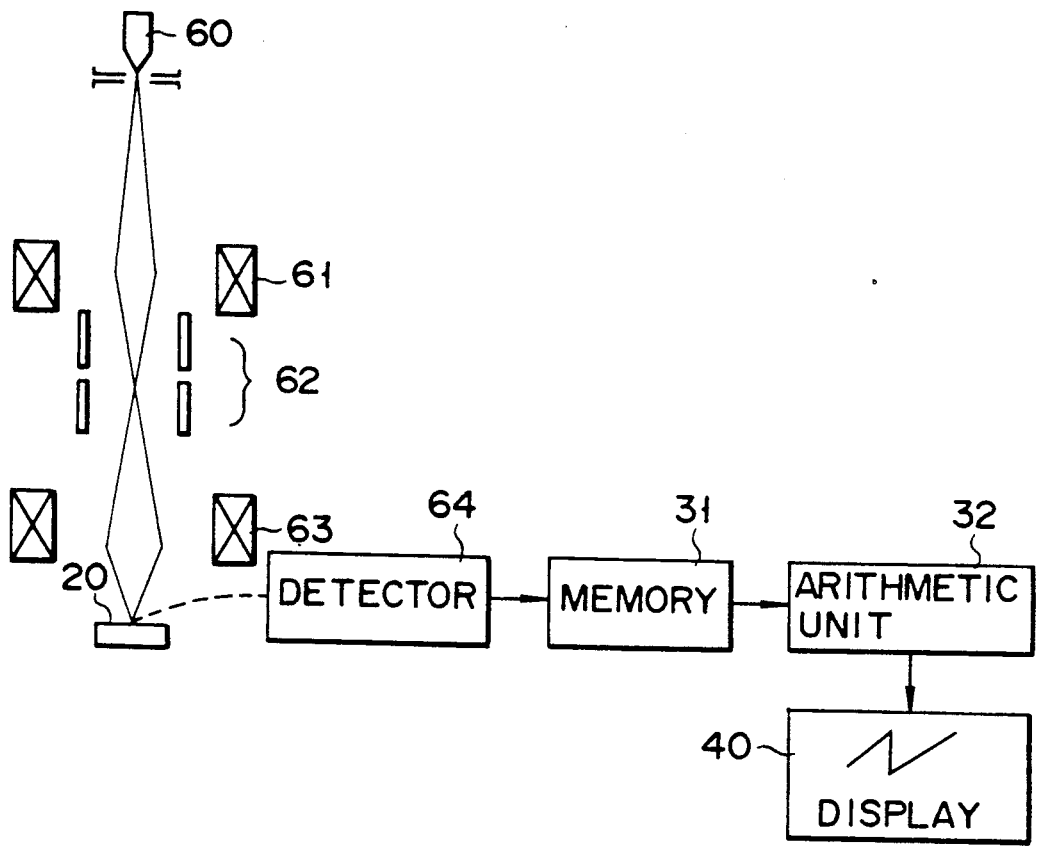
F I G. 11

HIGH RESOLUTION MICROSCOPING SYSTEM USING CONVOLUTION INTEGRATION PROCESS

BACKGROUND OF THE INVENTION

1. Field of the Invention

The present invention relates to a high resolution microscoping system using a convolution integration process and, more particularly, to a microscoping apparatus and method which can enlarge an image at a higher magnification than a conventional microscope, by using an electromagnetic wave, such as a light beam, an electron beam, or an X-ray beam, or a wave, such as a sound wave or an ultrasonic wave, as a probe.

2. Description of the Related Art

When a microscopic object is to be enlarged by a microscope so as to be visually observed or displayed as an image, the magnification has its limit. In optical microscopes, this limit corresponds to the diffraction limit based on the fact that light is a wave.

In optical system shown in FIG. 1, it is conventionally known that a resolvable distance $\gamma_0$ at which two separate points on an object can be seen separately is given by $$\gamma_0 = \frac{0.61\lambda}{n_0 \sin\theta_0} \quad (1)$$

where $\lambda$ is the wavelength of light, $n_0$ is the refractive index of a medium between the object and the lens, $\theta_0$ is the angular aperture of the objective lens, and $n_0\sin\theta_0$ is the numerical aperture of the objective lens.

If, $n_0 = 1.5$ $\theta_0 = 60°$ $\lambda = 0.5 \ \mu m$ then, the numerical aperture is about 1.3, and the resolution is given as follows according to equation (1):

$\gamma_0 = 0.24 \ \mu m$

However, it is very difficult to manufacture a lens having no aberrations with a numerical aperture of 1.3. Besides, it is almost impossible to increase the numerical aperture.

If the wavelength of illumination light is shortened, the resolution is increased in proportion to the wavelength. Assume that the wavelength is shortened to fall within the ultraviolet range (400 nm or less). In this case, naturally, the light cannot be seen by the unaided eyes, and the sensitivity of a currently available imaging element is not good enough for such light. In addition, optical materials for a good lens are undesirably limited. Therefore, a great reduction in wavelength is difficult to achieve.

A scanning laser microscope (laser microscope, disclosed in U.S. Pat. No. 4,733,063 "Scanning Laser Microscope with Aperture Alignment) is expected to increase the resolution. In such a microscope, similar to normal optical microscopes, an increase in resolution is limited to 30 to 40% due to the diffraction limit.

Electron microscopes which greatly exceed the resolution of such a normal optical microscope have been developed. In comparison with optical microscopes having a maximum magnification X3000, it is expected that a scanning electron microscope (SEM) can realize a magnification as high as several hundred thousands. According to such a microscope, in order to realize a high magnification, electrons are accelerated by a high voltage, and a short wave length electron beam having high energy is used. For this reason, an object tends to be damaged. Under the circumstances, a metal film is formed on a nonconductive object in order to prevent charge accumulation, or a mold of an object is formed, thus allowing measurement of the object. An electronic microscoping system has been rapidly spread because of its resolution much higher than that of an optical microscope, in spite of the fact that a microscoping operation must be performed in a vacuum in addition to the above-mentioned limitations.

The problem of image recovery is associated with the present invention from a point of view different from an increase in resolution of a microscope. In this case, the problem of image recovery includes a wide variety of problems, e.g., processing a blurred photograph to recover a sharp photograph therefrom, reconstructing an image by a CT scan and removing noise, and demodulating a band-compressed electrical signal. It is inevitable that observed data includes fluctuations and noise and hence requires extra filtering operations. The following recent book reports studies on the problems of recovery and estimation of original images and signals from such data from various aspects:

(1) H. Stark, e.d.: "Image Recovery: Theory and Application", Academic Press (1987).

In addition, since recovery of an original signal from observed data having a band-limited frequency component is equivalent to recovery of a high-frequency component which cannot be observed, in addition to the original signal, such a technique is called an ultra-high resolution technique. Various studies have been made for such a technique, e.g., (2) D. Slepian and H.O. Pollak: Bell Syst. Tech. J., 40, PP. 43–64 (January 1961).

(3) D.C. Youla: IEEE Trans. Circuits & Syst., CAS-25, 9, PP. 694–702 (September 1978)

Images recovered by these techniques, however, are just an image which should be obtained when photography is performed to prevent fluctuations and noise, a signal which should be obtained when it is received to require no extra filtering operations, and an original signal which should be obtained when it is observed so as not to be band-limited. In photography, the best image which can be photographed by a given camera can be recovered. However, these techniques are not designed to obtain a photograph having higher resolution.

As described above, in an optical microscope using a lens having no aberrations, an optical image is blurred because light is a wave and is not free from diffraction. Conventionally, it is considered that this diffraction limit is a natural phenomenon and hence cannot be overcome.

SUMMARY OF THE INVENTION

It is, therefore, an object of the present invention to provide a new and improved high resolution microscoping apparatus using a convolution integration process which can obtain a high-resolution image by defining how a blurred optical image is determined by the brightness distribution of illumination light and the brightness/darkness distribution of an object, and obtaining the brightness/darkness distribution of the object on the basis of the blurred optical image and the brightness distribution of the illumination light.

It is another object of the present invention to provide a high resolution microscoping method using a convolution integration process, which can be commonly applied to a microscope for forming an object image by using a wave, such as an electromagnetic wave or a sound wave, as well as an optical microscope.

According to one aspect of the present invention, there is provided a microscoping apparatus for obtaining an image of an object by radiating a wave thereon, comprising:

wave source means for radiating a wave;

converging lens means for converging the wave from the wave source means to form a converging wave and to radiating the wave onto the object;

scanning means for scanning the converging lens relative to the object within an x-y plane;

scanning amount detecting means for detecting a scanning amount of the converging wave;

wave detecting means for detecting a secondary wave generated by interaction between the converging wave and the object;

first memory means for storing an intensity distribution g(x,y) of the converging wave;

second memory means for storing an output distribution I(x,y) of the wave detecting means which is obtained by scanning the converging wave on the object;

arithmetic operation means for calculating a sensitivity distribution f(x,y) representing an intensity of the interaction between the object and the converging wave on the basis of the data stored in the first and second memory means, and having a relationship of convolution integration represented by equation:

$$I(x,y) = K \int \int f(x',y') g(x'-x,y') dx' dy'$$

where K is a constant; and image display means for displaying a sensitivity distribution image output from the arithmetic operation means.

According to another aspect of the present invention, there is provided a microscoping method comprising the steps of:

radiating onto an object a converging wave having a function g(x,y), which represents an intensity distribution of the wave at a substantially beam waist section thereof, at a substantially a beam waist position of the converging wave, and scanning the converging wave on the object;

obtaining a function I(x,y) representing an intensity distribution of a secondary wave generated by the interaction between the converging wave and the object by the scanning operation; and obtaining a sensitivity distribution representing an intensity of the interaction between the object and the converging wave by obtaining a function f(x,y) in such a manner that the function I(x,y) satisfies convolution integration of a function g(x,y) and the function f(x,y).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 5 is a view showing the first embodiment of the present invention;

FIGS. 6A to 6D are a view showing an image processing function and flow charts for different solutions;

FIG. 11 is a view showing the sixth embodiment of the present invention.

DETAILED DESCRIPTION OF THE PREFERRED EMBODIMENTS

Figure 1:
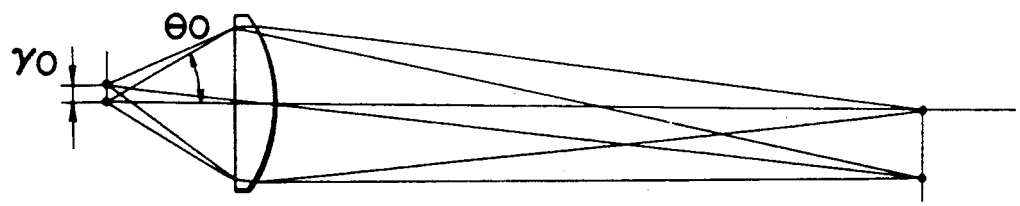
FIG. 1 is a view, showing a schematic view for explaining resolution of an optical microscope by a way of conventionally thinking.

Reference will now be made in detail to the presently preferred embodiments of the invention as illustrated in the accompanying drawings, in which like reference characters designate like or corresponding parts throughout the several drawings.

The principle of the present invention will be described below. According to the present invention, a high-resolution image which overcomes the diffraction limit is obtained by the following steps: scanning an object by using a light beam having a finite diameter as a probe, obtaining the intensity distribution of the light reflected by the object, and obtaining the brightness distribution of the object by performing calculation using the obtained data and the sectional intensity distribution of the light beam which is obtained in advance. As a result, an image which has a resolution much finer than the diameter of the light beam as the probe is obtained.

Figure 2A:
FIGS. 2A to 2D are views for explaining the principle of a high resolution microscoping apparatus according to the present invention.
Figure 2B:
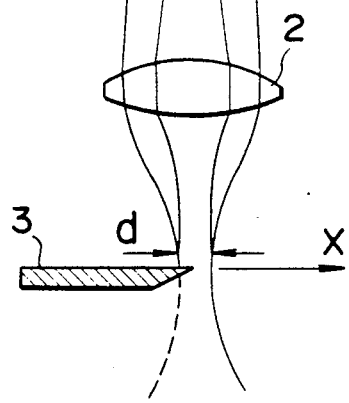
Figure 2B:
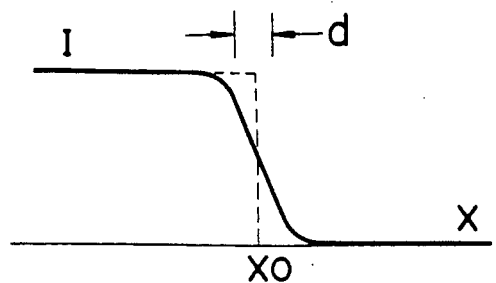

FIGS. 2A and 2B show a simplest case exhibiting the principle. FIG. 2A shows only an optical system. In this system, a light beam from a point source 1 is focused by an objective lens 2 and is subsequently radiated on a knife-edge 3, which has a sharp edge and a uniform reflectivity, at the beam waist position of the light beam. The light reflected by the knife-edge 3 is converted into an electrical signal by a light receiver 4 through the objective lens 2. An output I from the light receiver 4 is measured and recorded by a signal processing system (not shown) while the light beam is moved little by little from the left to the right in a direction indicated by an arrow x in the process of the above operation. The recorded output I exhibits a change shown in FIG. 2B. Reference symbol x0 denotes a position where the edge of the knife-edge coincides with the center of the light beam. In spite of the fact that the knife-edge has an ideally sharp edge, the output I is gradually changed within a range corresponding to a beam waist diameter d of the light beam. If this output is given as a one-dimensional image, the edge looks out of focus or blurred within the width d. Conversely, it can be estimated that the knife-edge which looks out of focus within the width d upon scanning of the light beam having the diameter d has an ideally sharp edge. Image recovery processing of the present invention is based on this estimation.

Figure 3A:
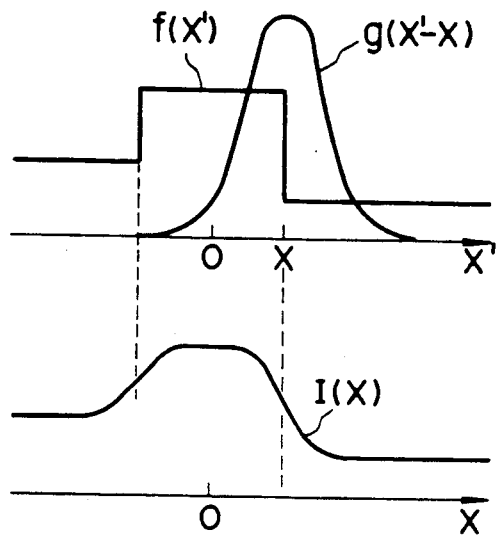
FIGS. 3A and 3B are graphs, showing sectional intensity distributions, for explaining FIGS. 2A and 2B.

This estimation will be described in more detail below with reference to the following equations. FIG. 3A shows the output I obtained when an object having a reflectivity distribution f(x) is placed on an x'-axis so as to have a reflectivity distribution f(x'), and a light beam having a sectional intensity distribution g(x') at the beam waist position scans the object in the x' direction. Assuming that the light beam is moved by a distance x in the x' direction, the sectional intensity distribution of the light beam is given by g(x'−x). An output I(x) from the light receiver in this case is represented as follows:

$$I(x) = K \int_{-\infty}^{\infty} f(x')g(x' - x)dx' \quad (2)$$

Figure 3B:
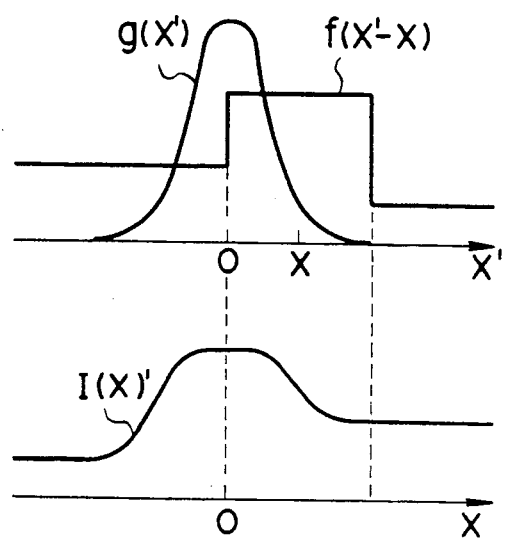

FIG. 3B shows an output I(x)' from the light receiver, which is obtained by moving the object while the light beam is fixed to a given position instead of scanning the light beam. The output I(x)' is represented as follows:

$$I(x)' = K \int_{-\infty}^{\infty} f(x' - x)g(x')dx' \quad (3)$$

I(x) and I(x)' have the following relationship:

$$I(x) = I(-x)'$$

Since scanning of the light beam is equivalent to moving of the object, equations (2) and (3) are equally used.

In equation (2), if the light beam is assumed to exhibit no spread or be collimated, g(x) may be considered as a delta function as follows:

$$g(x) = \delta(x)$$

A substitution of this delta function into equation (2) yields $$I(x) = k \int_{-\infty}^{\infty} f(x')\delta(x' - x)dx'$$
$$= Kf(x)$$

This expression just indicates, as a matter of fact, that an output from the light receiver which is obtained by scanning an object with a non-spread or collimated light beam exhibits a perfect reflectivity distribution of the object, and is not blurred. In the conventional laser microscopes, it is very important to form a narrow light beam. There have been no effective techniques available except for the technique of obtaining I(x), and hence the only available method is to narrow a light beam.

Figure 2C:
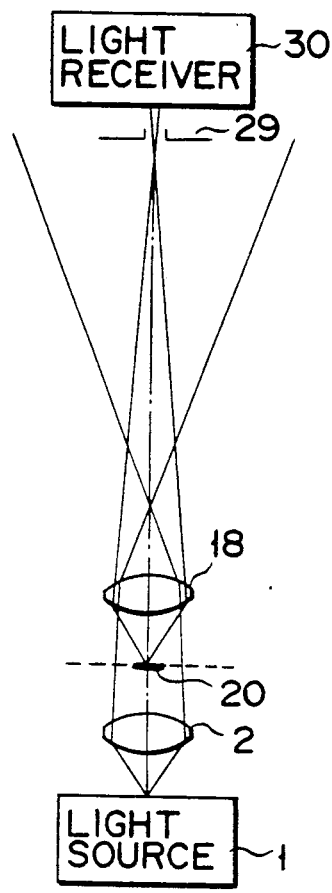
Figure 2D:
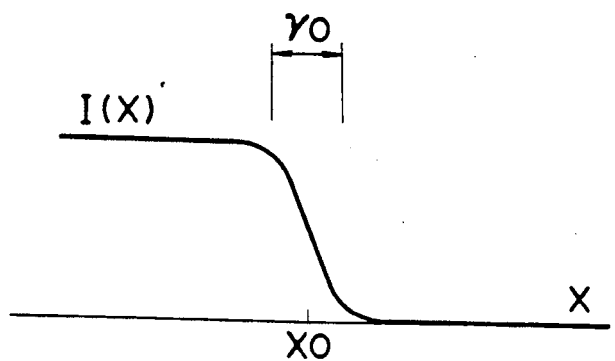

On the other hand, in the case of FIG. 2C, a transmission type optical system, an object 20 is illuminated by a light beam from a light source 1 through a condenser lens 2. An object image is formed at the position of a pinhole 29 by an objective lens 18. Light transmitted through the pinhole 29 is converted into an electrical signal by a light receiver 30. The diameter of the pinhole 29 is set to be less than the resolution of the optical system, e.g., about 1/10 the resolution. When an output I(x) from the light receiver 30 is recorded while the object 20, which has a sharp boundary, is moved little by little from the left to the right in the x direction, the output I(x) exhibits a change shown in FIG. 2D. The sharp brightness/darkness boundary is also blurred because a non-spread point image on the object spreads in a given region in accordance with the resolution of the optical system. If this spread is represented by a point spread function G(x), and the transmittance distribution of the object is given by F(x), $$I(x) = K \int_{-\infty}^{\infty} F(x')G(x - x')dx' \quad (2')$$

That is, an integral expression having similar form as that of equation (2) can be obtained. The function g(x) in equation (2) represents the intensity distribution of the beam waist sectional area, whereas the function G(x) in equation (2') is the point spread function.

Referring to FIG. 2C, if the pair of the pinhole 29 and the light receiver 30 is replaced with a CCD camera, the data of I(x) can be more easily obtained by electrical scanning instead of mechanical scanning. This is because one pixel of the CCD camera corresponds to the pinhole.

In mathematics, according to the strict definition, equation (2') is called convolution integral and equation (2) is generalized convolution integral (often called correlation integral). Therefore, equation (2') is also included in the generalized convolution integral. However, if g(x)=g(−x), equation (2) is equivalent to equation (2'). Since both the beam waist intensity distribution function g(x) and the point spread function G(x) are substantially centersymmetrical, replacement of g(x) with g(−x) or G(x) with G(−x) cause only a small error. Although the optical compositions of FIGS. 2A and 2C are different, characteristics and also the mathematical expressions of the images (I(x)) obtained are similar each other. Therefore, abbreviated expression of integral can be applied to equation (2) and (2') as followed, $$\{I\} = k\{f\} * \{g\}$$

and can be called convolution integral.

Generally, it is difficult to analytically solve f(x) from equation (2). However, if f(x) is estimated and is substituted in equation (2), the accuracy of the estimation can be determined. Therefore, the most probable solution can be obtained by using various arithmetic processing techniques.

An example of such techniques will be described below. In consideration of the fact that the conventional laser microscopes process I(x) as an object image itself, if I(x) is substituted in equation (2) as a first approximate expression $f_1(x)$ of $f(x)$, a virtual light receiver output $I_1(x)$ is given as follows:

$$I_1(x) = k \int_{-\infty}^{\infty} I(x')g(x' - x)dx'$$

Since $I(x)$ is used in place of $f(x)$, $I_1(x)$ exhibits a more blurred condition than $I(x)$. The difference $$\Delta I_1(x) = I(x) - I_1(x)$$

is based on the fact that true $f(x)$ is approximated by $I(x)$. Therefore, if a function $f_2(x)$ obtained by adding the difference to $I(x)$, i.e., $$\begin{aligned} f_2(x) &= I(x) + \Delta I_1(x) \\ &= 2I(x) - I_1(x) \end{aligned}$$

is used as a second approximate function of $f(x)$, a light receiver output $I_2(x)$ can be further approximated to $I(x)$. If this operation is repeated, e.g., n approximations are performed, the following output can be obtained:

$$f_n(x) = nI(x) - \sum_{j=1}^{n-1} I_j(x)$$

$$\Delta I_n(x) = I(x) - I_n(x)$$

Figure 4A:
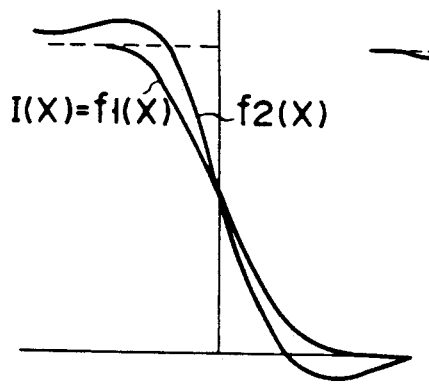
FIGS. 4A to 4C are graphs for explaining successive approximation using the distributions shown in FIGS. 3A and 3B.
Figure 4B:
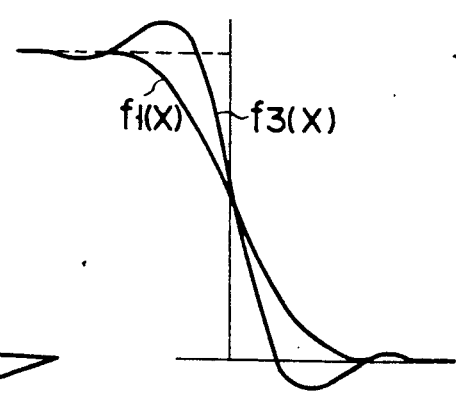
Figure 4C:
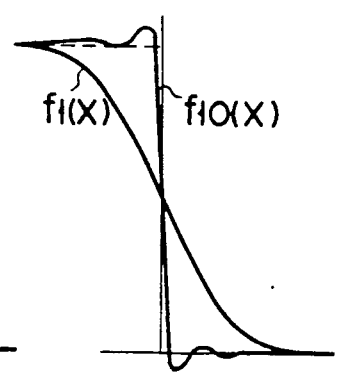

FIGS. 4A, 4B, and 4C respectively show a sequence of successive approximation. In this case, the reflectivity distribution of an object is given by $$f(x) = \begin{array}{ll} 1 & x \leq 0 \\ 0 & x > 0 \end{array}$$

FIGS. 4A, 4B, and 4C respectively show comparisons between a measurement value $I(x) = f1(x)$ and approximate values $f2(x)$, $f3(x)$, and $f10(x)$.

When $f_n(x)$ is sufficiently approximated to $f(x)$, the maximum value of $|\Delta I_n(x)|$ becomes small compared with a measurement error of $I(x)$. In addition, an integral value of $\{\Delta I_n(x)\}^2$ is sufficiently small, and hence an increase in n makes no difference. This technique is called successive approximation. In successive approximation, in order to quicken convergence, $$f_2(x) = I(x) + \alpha \Delta I_1(x)$$

is generally used while the coefficient $\alpha$ is set to be 1 or more. Empirically, this equation is often used within the range of $1 \leq \alpha < 2$. In addition to the method using equation (2), other methods are available, e.g., methods of using Fourier transform and matrix operations. In these methods, however, sequential approximation must be performed because of limitations on frequency ranges and incomplete boundary conditions. An operation sequence will be described in detail later in the description of embodiments.

The image estimated in the above-described manner has much finer information than $I(x)$, and is not blurred even if it is enlarged. The degree of magnification beyond which the image is blurred depends on the accuracy of $g(x)$ and the amount of calculated noise included in $I(x)$. In the above description, $g(x)$ is assumed to be a known value. If, however, $g(x)$ is not known in advance, $g(x)$ is estimated by measuring an object whose accurate reflectivity distribution is known, e.g., the knife-edge shown in FIG. 2A. In this case, since it is assumed that $$f(x) = \begin{array}{ll} 1 & x \leq 0 \\ 0 & x > 0 \end{array}$$

a light receiver output is given as follows according to equation (3):

$$I(x) = K \int_{-\infty}^{x} g(x')dx' \quad (4)$$

This value is obtained by integrating the intensity distribution of a light beam having the center at the position of $x=0$ from $-\infty$ to $x$. That is, $g(x)$ is obtained as a differential value of the obtained light receiver output $I(x)$.

The above description is associated with a case of obtaining the reflectivity distribution image of an object. However, the above description is equally applied to a case of obtaining a transmittance distribution image in consideration of the fact that transmission type microscopes are also available.

The above-described principle associated with a one-dimensional image can be easily extended to a two-dimensional image. More specifically, the following equations can be presented as equations corresponding to equations (2) and (3):

$$I(x,y) = k \int_{-\infty}^{\infty} \int_{-\infty}^{\infty} f(x',y')g(x'-x,y'-y)dx'dy' \quad (5)$$

$$I(x,y) = k \int_{-\infty}^{\infty} \int_{-\infty}^{\infty} f(x'-x,y'-y)g(x',y')dx'dy' \quad (6)$$

With regard to equation (4), the following equations can be given: when $$f_A(x,y) = \begin{array}{ll} 1 & x \leq 0 \\ 0 & x > 0 \end{array} \quad (7)$$

then, $$I_A(x) = k \int_{-\infty}^{\infty} \int_{-\infty}^{x} g(x',y')dx'dy' \quad (8)$$

and when $$f_B(x,y) = \begin{array}{ll} 1 & y \leq 0 \\ 0 & y > 0 \end{array} \quad (9)$$

then, $$I_B(y) = k \int_{-\infty}^{y} \int_{-\infty}^{\infty} g(x',y')dx'dy' \quad (10)$$

In the above-described technique, from an image obtained by scanning an object with a narrowed light beam, an image having a higher resolution is obtained. Another technique will be described below, which is equivalent to the above-described technique in terms of the technical idea and can be reduced to the integral expressions (2), (3), (5), and (6).

As described above, in the system for obtaining an object image by scanning a narrow light beam, according to the present invention, a blurred image obtained with an increased magnification can be expressed by convolution integration of the sectional intensity distribution of the scanning beam and the reflectivity distribution of the object surface. If the sectional intensity distribution of the scanning light beam waist is accurately obtained in advance, a solution which best approximates the convolution integral expression is given as an enlarged image of the accurate brightness/darkness distribution of the object. The the beam diameter can be reduced to about 0.3 μm. According to the present invention, a minute object having a size 1/10 the beam diameter can be resolved and observed.

Assume that the object surface is deviated from the light beam waist. In this case, since the beam spreads more at the object surface than at the beam waist, even if a solution of convolution integration is estimated by using the beam waist sectional intensity distribution, the brightness/darkness distribution of the object cannot be properly obtained. However, since this state corresponds to a blurred state of a normal image due to defocusing, focusing can be adjusted to obtain a sharpest brightness/darkness distribution.

In addition, if an image obtained by the optical system is enlarged until it is blurred according to the normal concept, and the point spread function of the optical system is used in combination with this operation, the same object as described above can be achieved.

The present invention is not limited to the field of optics and can be applied to another field, in which imaging of an object is performed by using waves, without any modifications. In a scanning electron microscope, an object is scanned with a converging electron beam, and the intensities of secondary electrons radiated from the object are detected. Assume that the sectional intensity distribution of the converging electron beam at the beam waist position is represented by $g(x,y)$; the secondary electron emission distribution of the object, $f(x,y)$; and the detection secondary electron intensity distribution, $I(x,y)$. In this case, these functions have a relationship represented by equation (5) or (6), and hence can be treated in the same manner as in optics. A resolution of 1 nm can be obtained by using an electron beam having a diameter of 20 nm which is obtained by a low acceleration voltage of 1 kV.

Furthermore, in an X-ray microscope and an ultrasonic microscope, a converging X-ray beam and a converging ultrasonic wave are respectively radiated onto an object. In each microscope, imaging is performed by detecting a transmitted wave. The above-described concept can be equally applied to these microscopes.

The above-described operation concept as the principle of the present invention will be summarized below.

A wave (a light beam, an electron beam, an X-ray beam, and an ultrasonic wave) obtained from a point-like wave source (a light source, an electron gun, an X-ray source, and an ultrasonic source) is caused to converge on an object through a converging lens (an optical lens, an electron lens, an X-ray reflecting mirror, and an ultrasonic lens). The converging wave is scanned relative to the object within the x-y plane by a scanning means (a mechanical micro stepper or a deflector). A secondary wave generated by interaction (reflection, scattering, transmission, and secondary electron emission) between the converging way and the object is then detected by a wave detector (light, electron, X-ray, and ultrasonic detectors). An output distribution $I(x,y)$ from the detector is represented by the convolution integration of a intensity distribution $g(x,y)$ of the converging wave and a sensitivity distribution $f(x,y)$ (reflectivity, scattering intensity, transmittance, and secondary electron emission distributions) representing the intensity of interaction between the object and the converging wave. Therefore, an enlarged image can be obtained by calculating $f(x,y)$ from the known values $g(x,y)$ and $I(x,y)$.

Embodiments of the present invention based on the above-described principle will be described below.

FIG. 5 shows the first embodiment of the present invention. A light beam from a point light source 10 is reflected by a partial mirror 17 and is focused by an objective lens 18 to form a small beam waist. An object 20 is placed at the beam waist position of the above-mentioned optical system. The light reflected by the object 20 is received by a light receiver 30 through the partial mirror 17.

The object 20 is placed on a mounting base 22 which is arranged on substantially the center of a micro stepper 21 so as to be micro-stepped. The micro stepper 21 has the following structure. The mounting base 22 is supported on the micro stepper 21 by parallel springs 23. The mounting base 22 is micro-stepped by a piezoelectric actuator 24A for x-direction micro stepping arranged between the micro stepper 21 and the mounting base 22. The micro stepping of the mounting base 22 is detected by a laser interferometer 25A arranged on one end of the micro stepper 21. In this case, the driving shaft of the piezoelectric element of the piezoelectric actuator 24A and the light beam from the interferometer 25A are set to be located within the same plane as the object surface so as to satisfy the Abbe's principle. The mounting base 22 is moved by the piezoelectric actuator 24A on the order of 10 μm. The laser interferometer 25A is of a heterodyne scheme and has a resolution of 1 nm ($\lambda/600$) according to phase measurement.

FIG. 5 shows an arrangement in which only x-direction one-dimensional movement by means of the piezoelectric actuator 24A for x-direction micro stepping and measurement thereof can be performed. However, in order to obtain a two-dimensional image, the micro stepper 21 includes a piezoelectric actuator 24B for y-direction micro stepping and an interferometer 25B, although they are not shown. Therefore, two-dimensional (x-y) movement and measurement thereof can be performed. In addition, the overall micro stepper 21 is arranged on an xyz stage 26 so as to arbitrarily position the object 20 with respect to the optical system.

In order to scan the object 20 with a light beam, a voltage controller 240 (250) gradually increases a voltage applied to the piezoelectric actuator 24A for x-direction micro stepping while fixing the voltage of the piezoelectric actuator 24B for y-direction micro stepping. Every time the measurement value of the x-direction interferometer 25A is increased by a predetermined value, e.g., $\Delta x=10$ nm, a trigger pulse 251 is output so as to sample an output from the light receiver 30 at the moment. Every time one scanning operation in the x direction is completed, the voltage of the piezoelectric actuator 24B for y-direction micro stepping s changed. After the object 20 is moved by a measurement value of the y-direction interferometer 24B, e.g., $\Delta y=10$ nm, the object is fixed, and data sampling is performed in the same manner as described above. By repeating this procedure, light amount data at the respective two-dimensional (x-y) lattice points at a pitch of 10 nm can be obtained as follows:

$$I(xi,yj)(i=1,2,\ldots,M;j=1,2,\ldots,N)$$

These data are temporarily stored in a memory 31 and are subjected to image processing in an arithmetic unit 32 for performing operations for convolution integration and successive approximation. The processed data is then displayed on a display 40 as an image.

Note that the memory 31 has a plurality of memory areas including memory areas for g(x,y) (to be described later) and the above-mentioned successive approximation in addition to a memory area for the above-mentioned data I(xi,yj).

FIG. 6A shows a overall functional arrangement for image processing by means of the arithmetic unit 32. FIG. 6B shows a flow chart of this processing, which corresponds the above-described method of estimating f(x). In the above-description, f(x) is treated as a continuous amount. In this case, however, I(x,y), fn(x,y, and g(x,y) are all discrete data having equal intervals corresponding to the two-dimensional (x−y) lattice points. Therefore, an operation corresponding to the integral calculation of equation (2), which is to be performed by the arithmetic unit 32, is an addition operation represented by $$I(xi,yj) = K \sum_{\gamma=1}^{M} \sum_{j=1}^{N} f(xr,ys)g(xr - xi, ys - yj) \cdot \Delta x \Delta y \quad (11)$$

The value g(x,y) generally corresponds to a small beam waist, and abruptly approaches zero as a distance from the center is increased. Therefore, an operation corresponding to equation (11) may be performed in a region where g(x,y) is not zero with (xi,yj) being the center, e.g., a region about three times the beam waist diameter.

Actual measurement values are used for the distribution g(x,y), most typically, a Gaussian distribution is used. Actual measurement values are normally close to the values of this distribution. Therefore, g(x,y) is actually measured and stored in the memory 31 in advance.

I(xi,yj) is measured in a finite region. In order to estimate an image near the boundary of the region, data outside the region must be obtained. For this reason, data outside the region is arranged on the assumption that the data outside the region is mirror-symmetrical with the data inside the region about the boundary. Since g(x,y) has a property that it has a value which is not zero only in a small region, it is influenced by this assumption only in a region close to the boundary. All the values outside the region may be set to be zero at the cost of a slightly larger range of influences.

Note that the above-described sequence of data processing may be performed by sequence control using a controller 50 such as a CPU.

Figure 6C:
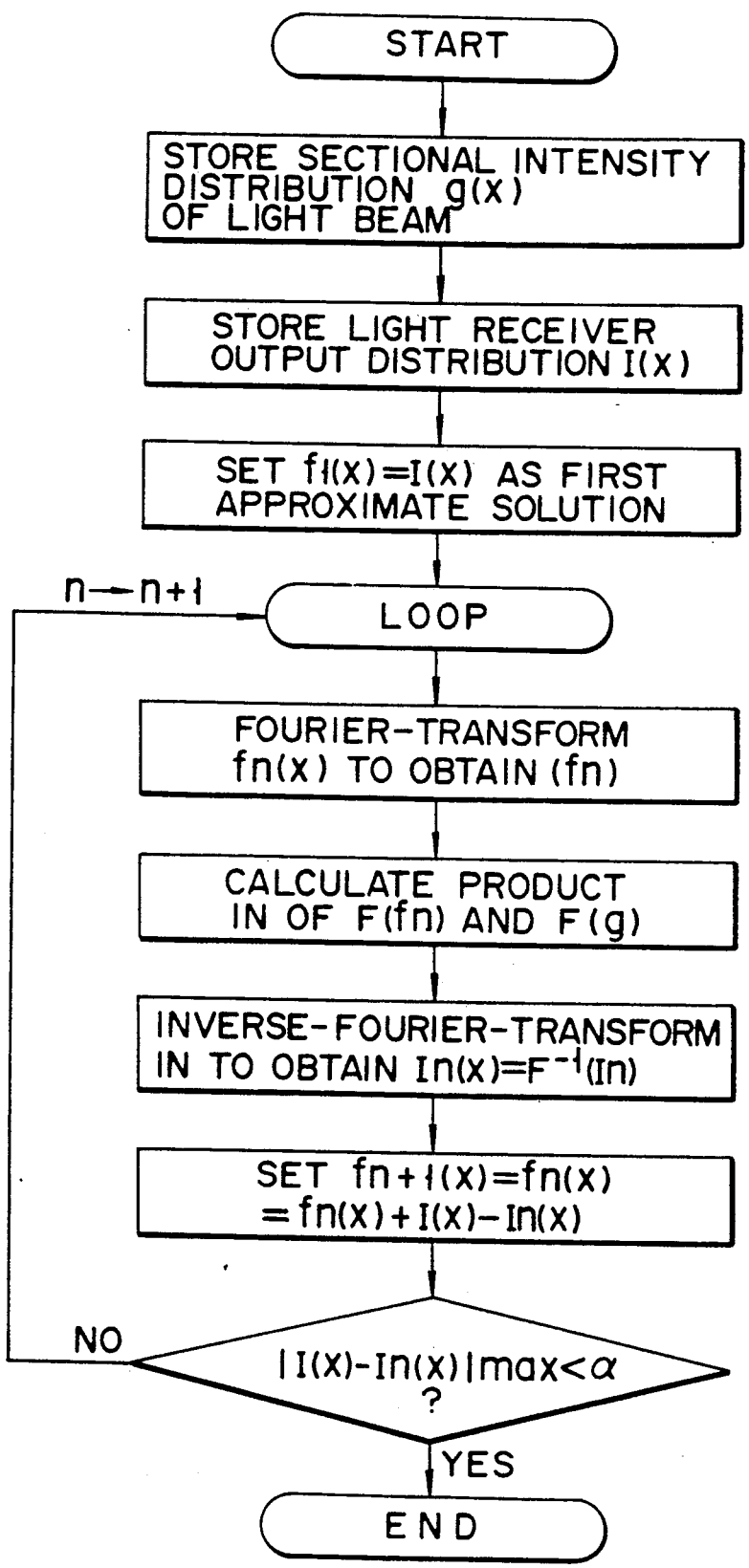
Figure 6D:
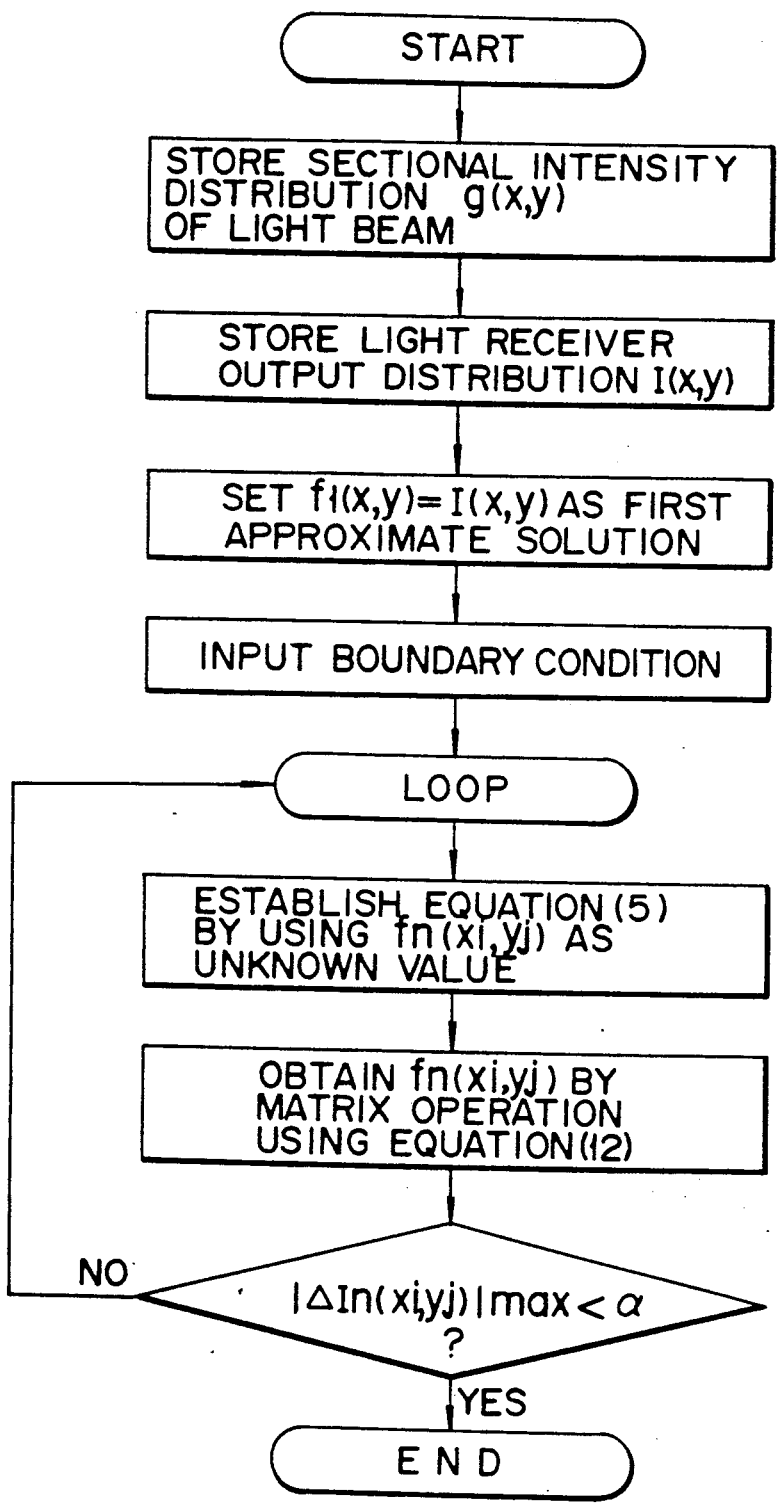

FIG. 6C is a flow chart showing a routine of data processing when Fourier transform is used. FIG. 6D is a flow chart showing a routine of data processing when a matrix operation is used as a third solution.

Figure 7:
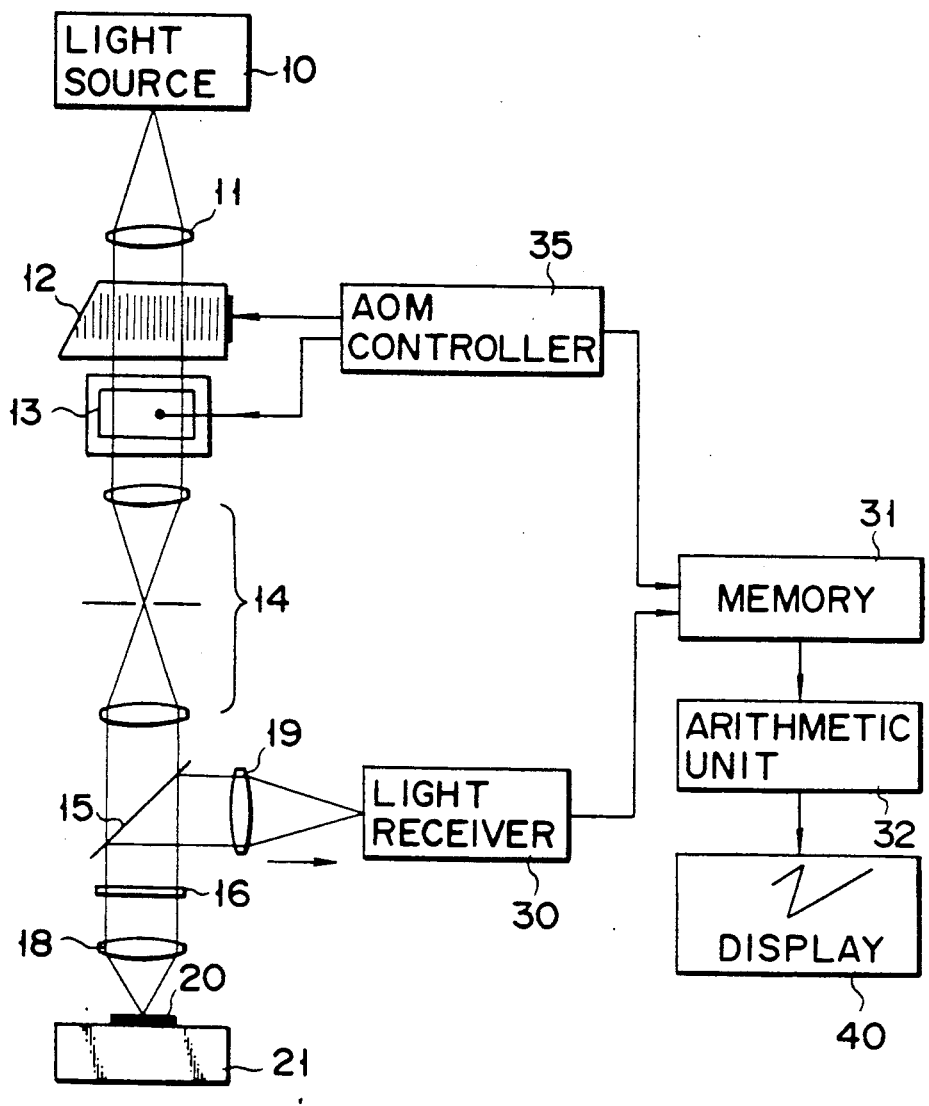
FIG. 7 is a view showing the second embodiment of the present invention.

FIG. 7 shows the second embodiment of the present invention, which differs from the first embodiment in a method of scanning a light beam.

Light from a light source 10 is substantially collimated by a lens 11. The collimated light beam is deflected in the x direction by a first ultrasonic deflector (to be referred to as an AOM) 12 and is then deflected in the y direction by a second AOM 13. Non-deflected light (zeroth-order diffracted light) is cut by an optical system 14 constituted by two lenses and a pinhole. The light beam is converted into circularly polarized light by a polarizing beam splitter 15 and a λ/4-plate 16, and a small beam waist is formed on an object 20 by an objective lens 18. The light reflected by the object 20 is reflected by the polarizing beam splitter 15 and is converted into an electrical signal by a light receiver 30 through a lens 19. The ultrasonic frequencies of the AOMs 12 and 13 can be variably controlled by an AOM controller 35.

If the ultrasonic frequency is changed stepwise from f1 to f2 in units of small values Δf, the deflection angle is changed in proportion to Δf. With this operation, the beam waist is scanned on the object surface. Outputs from the light receiver 30 upon x-y scanning are stored, and are subjected to the same data processing as in the first embodiment. Although Δf is proportional to a scanning amount on the object surface, a proportionality coefficient is required to measure the length of the object in a final image. In order to obtain this proportionality coefficient, an object having a pattern whose size is measured by another method may be used to from an image by using the apparatus of the present invention, and the pattern of this image is measured.

Figure 8:
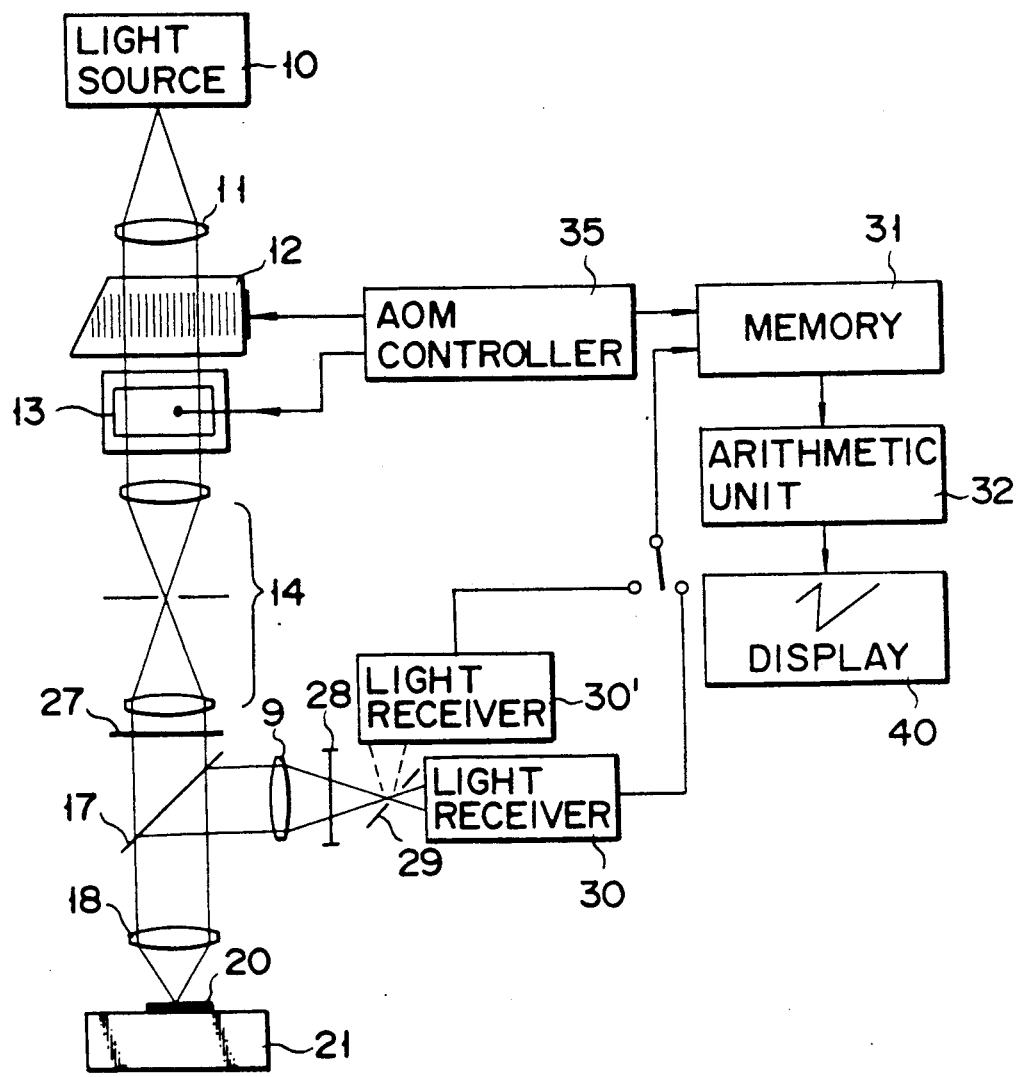
FIG. 8 is a view showing the third embodiment of the present invention.

FIG. 8 shows the third embodiment of the present invention, in which the polarizing beam splitter 15 and the λ/4-plate 16 in the second embodiment are replaced with a partial mirror 17, a polarizing unit 27 is arranged in front of the partial mirror, and a polarizing unit 28 and a spatial filter 29 are arranged in front of light receivers 30 and 30'. The polarizing unit 28 is rotatably supported to selectively transmit a light component parallel to the polarizing direction of the polarizing unit 27 on the light source side or a light component perpendicular thereto. Assume that the polarizing unit 28 is set to transmit a light component perpendicular to the polarizing direction on the light source side. In this case, with a normal mirror surface causing regular reflection, the image looks dark, and with a mirror surface having strong scattering properties or optical anisotropy, the image looks bright.

The spatial filter 29 is designed to transmit a reflecting point image formed when an object surface is placed at the beam waist position and to reflect a light beam spreading around the image. The reflecting image may spread in the following cases: a case wherein the object surface is not positioned at the beam waist, a case wherein the object surface has a complex two-dimensional pattern and reflection occurs twice or more times, and a case wherein diffuse reflection is caused by transparent particles. Therefore, signals from the light receiver 30 are used to observe only specular reflection light components, and signals from the light receiver 30' are used to observe complex reflection or diffuse reflection light components. Such a manner of using the polarizing units and the spatial filter independently or in combination with each other is especially effective in the studies of physical properties and living organs.

Figure 9:
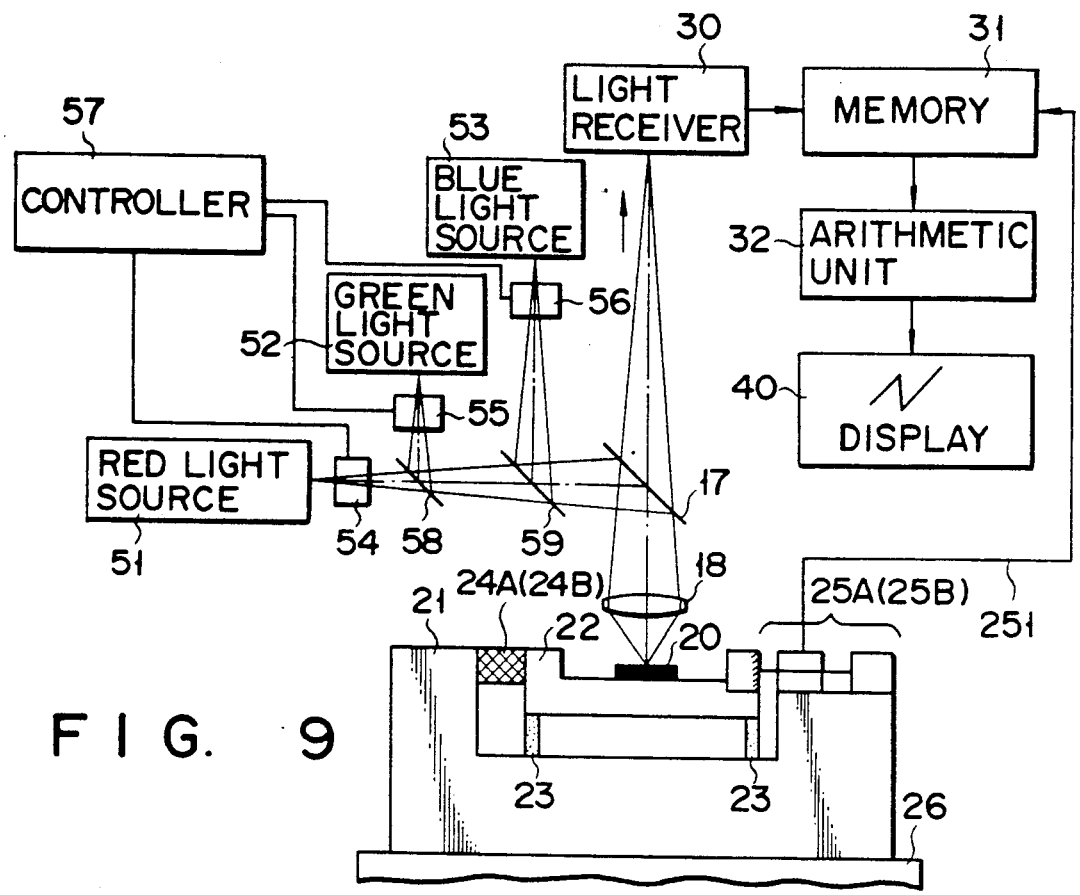
FIG. 9 is a view showing the fourth embodiment of the present invention.

FIG. 9 shows the fourth embodiment of the present invention. In addition to the arrangement of the first embodiment, the fourth embodiment includes light sources of three primary colors, i.e., red, green, and blue which can be switched. Reference numerals 51, 52, and 53 denote red, green, and blue (primary color) light sources, respectively; and 54, 55, and 56, shutters which are operated at high speed by electrical signals and are constituted by electro-optic shutters, respectively. These electro-optic shutters are controlled by a controller 57. Reference numerals 58 and 59 denote dichroic mirrors respectively having cutoff wavelengths at the middle points between red and green, and green and blue. Therefore, light beams of three colors passing through the dichroic mirrors 58 and 5 form beam waists at the same position through the same optical path with almost no loss.

The light sources are switched at high speed during scanning of the beam waists, and the reflected light having each wavelength is received by a single light receiver 30 and is stored. This operation is repeated at each scanning position. The obtained data are subjected to the above-described image processing in units of wavelengths, and are subsequently superposed on each other to obtain a color image.

Figure 10:
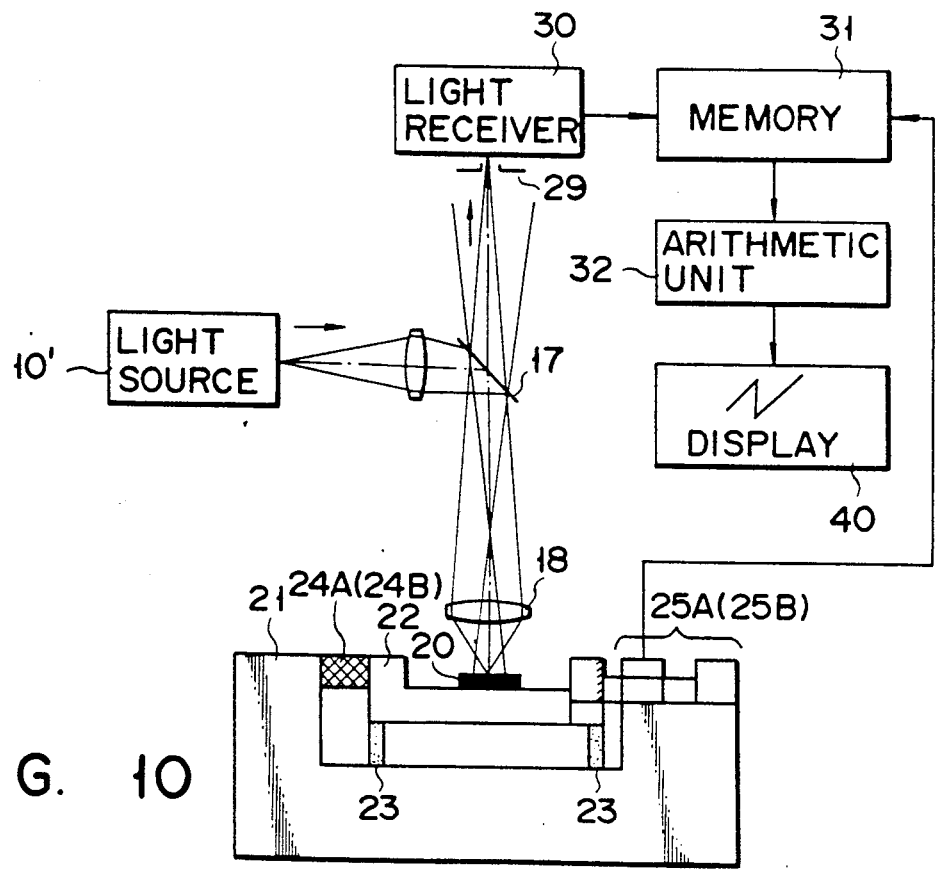
FIG. 10 is a view showing the fifth embodiment of the present invention.

FIG. 10 shows the fifth embodiment of the present invention. Light from a light source 10' is focused by a lens 5 and is reflected by a partial mirror 17. A beam waist is then formed at the near focal point of an objective lens 18 and is substantially collimated to be radiated onto an object 20. An image formed by the object lens 18 is transmitted through the half mirror 17 and is formed on the plane of a pinhole 29. The light transmitted through the pinhole 29 smaller than the resolution of the objective lens 18 is received by a light receiver 30. The object 20 is placed on a micro stepper 21 identical to the one in FIG. 5, and is moved relative to the objective lens 18 by a piezoelectric element 24. With this operation, the pinhole 29 scans the object image. Since the light amount data obtained in this manner corresponds to I(xi,yj) in equation (12), estimation of an image can be performed in the same manner as in the technique using equation (12).

FIG. 11 shows the sixth embodiment of the present invention. The five embodiments described above are associated with optical microscopes. However, the embodiment in FIG. 11 is associated with an electron microscope and has the same arrangement as that of the detecting section of a normal SEM (scanning electron microscope).

Referring to FIG. 11, reference numeral 60 denotes a field emission type electron gun; 61, a converging lens; 62, a deflector for scanning; and 63, an objective lens. A converging electron beam is radiated onto an object 20, and the obtained radiant secondary electrons are detected by a detector 64. Arithmetic processing of an electron beam image is performed by the same method as that described with reference to the first and second embodiments.

As has been described above, according to the present invention, the beam waist of a converging wave is considered first, and it is found that the resolution of a conventional microscope, which has been considered to be limited by the size of a beam waist, can be increased by using the relationship between the obtained image I(x,y) and the convolution integration (convolution) of the intensity distribution g(x,y) of the sectional area of the converging wave at the beam waist position and the function f(x,y) representing the object to be observed.

The present invention overcomes the generally accepted concept that the resolution of a microscope is physically limited due to diffraction of a wave to be used, and realizes high resolution. The first portion of the detailed description of the preferred embodiments is associated with the technical idea of the present invention, and the embodiments of the high resolution microscoping apparatuses based thereon are subsequently described. In the embodiments, the two basic scanning methods are exemplified, i.e., the method of mechanically moving an object, and the method of scanning a light beam itself. In addition, the elaborate methods of receiving light and the coloring method are described as variations. These methods can be used independently or in combination with each other.

In the last embodiment, the electron microscope is exemplified in which the detecting section has the same arrangement as that of the detection section of a normal SEM. In this embodiment, high resolution can be realized by the same method as in the above-described optical microscopes. In addition, when the relation of $\{I\}=\{g\}*\{f\}$ is taken into consideration, various applications can be made within the scope of the principle of the present invention.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A microscoping apparatus for obtaining an image of an object by radiating a wave thereon, comprising:
    wave source means for radiating a wave;
    converging lens means for converging the wave from said wave source means to form a converging wave and to radiating the wave onto the object;
    scanning means for scanning the converging lens relative to the object within an x-y plane;
    scanning amount detecting means for detecting a scanning amount of the converging wave;
    wave detecting means for detecting a secondary wave generated by interaction between the converging wave and the object;
    first memory means for storing an intensity distribution g(x,y) of the converging wave;
    second memory means for storing an output distribution I(x,y) of said wave detecting means which is obtained by scanning the converging wave on the object;
    arithmetic operation means for calculating a sensitivity distribution f(x,y) representing an intensity of the interaction between the object and the converging wave on the basis of the data stored in said first and second memory means, and having a relationship of convolution integration represented by equation (1):

$$I(x,y) = K \int \int f(x',y')g(x'-x,y'-y)dx'dy' \qquad (1)$$

where K is a constant; and
    image display means for displaying a sensitivity distribution image output from said arithmetic operation means.

2. An apparatus according to claim 1, further comprising:
    third memory means for storing an output distribution $I_A(x)$ from said wave detecting means which is obtained by scanning an object A with the converging wave in the x direction, the object A being represented by $f_A(x,y)$ in equation (2)

$$f_A(x,y) = \begin{matrix} 1 & x \leq 0 \\ 0 & x > 0 \end{matrix} \qquad (2)$$

fourth memory means for storing an output distribution $I_B(y)$ from said wave detecting means which is obtained by scanning a object B with the converging wave in the y direction, the object B being represented by $f_B(x,y)$ in equation (4)

$$f_B(x,y) = \begin{matrix} 1 & y \leq 0 \\ 0 & y > 0 \end{matrix} \qquad (4)$$

fifth memory means for storing sensitivity distributions of the objects A and B, and arithmetic operation means for calculating the intensity distribution g(x,y) of the converging wave on the basis of the data stored in said third, fourth, and fifth memory means so as to satisfy equations (3) and (5)

$$IA(x) = K \int_{-\infty}^{\infty} \int_{-\infty}^{y} g(x',y')dx'dy' \qquad (3)$$

$$IB(y) = K \int_{-\infty}^{x} \int_{-\infty}^{\infty} g(x'y')dx'dy' \qquad (5)$$

3. A microscoping apparatus comprising:
light source means for emitting a light beam;
objective lens means for focusing the light beam from said light source to form a beam waist on an object;
scanning means for scanning the beam waist relative to the object within an x-y plane;
scanning amount detecting means for detecting a scanning amount of the beam waist;
light receiving means for detecting a secondary light beam generated by interaction between the light beam and the object;
first memory means for storing an intensity distribution g(x,y) of a beam waist section of the light beam;
second memory means for storing an output distribution I(x,y) of said light receiving means which is obtained by scanning the beam waist on the object; and
arithmetic operation means for calculating a brightness/darkness distribution f(x,y) of the object on the basis of the data stored in said first and second memory means, the object and the brightness/darkness distribution f(x,y) having a relationship of convolution integration represented by equation (1)

$$I(x,y) = K \int \int f(x',y')g(x'-x,y'-y)dx'dy' \qquad (1)$$

where K is a constant.

4. An apparatus according to claim 3, wherein said scanning means comprises:
a base on which the object is mounted,
an x-direction piezoelectric element, having a center within the x-y plane and arranged in contact with one side of said base in the x direction, for microstepping moving said base in the x direction,
a y-direction piezoelectric element, having a center within the x-y plane and arranged in contact with the one side of said base in the y direction, for microstepping said base in the y direction, and
a controller for separately controlling voltages to be applied to said x- and y-direction piezoelectric elements, and
said scanning amount detecting means is constituted by x- and y-direction laser interferometers, arranged on a side opposite to the side where said piezoelectric elements are arranged, for detecting movement amounts of said base by said piezoelectric elements.

5. An apparatus according to claim 3, wherein said scanning means comprises an acousto-optical modulator, scanning of a light spot being performed by changing a frequency of a signal applied to said acousto-optical modulator from a frequency f1 to a frequency f2 so as to change a direction of the light beam.

6. An apparatus according to claim 3, wherein when the light beam is polarized, a polarization analyzer is arranged in front of said light receiving means for detecting the secondary light beam.

7. An apparatus according to claim 3, wherein a spatial filter is arranged in front of said light receiving means for detecting the secondary light beam.

8. An apparatus according to claim 3, wherein said light source means is designed to switch three primary colors, red, green, and blue, and to cause light beams of the primary colors to form beam waists at the same position.

9. A microscoping apparatus comprising:
light source means;
condenser lens means for illuminating an object;
objective means for forming an object image;
scanning means for scanning the object relative to the objective means;
pin hole means for determining a small area in the object image;
light receiving means for detecting light passing through said pin hole means;
first memory means for storing an intensity distribution g(x,y) of a beam waist section of the light beam;
second memory means for storing an output distribution I(x,y) of said light receiving means which is obtained by scanning the beam waist on the object; and
arithmetic operation means for calculating a brightness/darkness distribution f(x,y) of the object on the basis of the data stored in said first and second memory means, the object and the brightness/darkness distribution f(x,y) having a relationship of convolution integration represented by equation (1):

$$I(x,y) = K \int \int f(x',y')g(x-x',y-y')dx'dy' \qquad (1)$$

where K is a constant.

10. A microscoping apparatus comprising:
electron gun means, having an electron beam source, for accelerating and radiating an electron beam;
electron lens means for converging the electron beam from said electron gun means to form a beam waist on an object;
scanning means for scanning the beam waist relative to the object in an x-y plane;
scanning amount detecting means for detecting a scanning amount of the beam waist;

electron beam detecting means for detecting a secondary electron beam generated by interaction between the electron beam and the object;

first memory means for storing an electron beam intensity distribution g(x,y) of a beam waist section of the electron beam;

second memory means for storing an output distribution I(x,y) of said electron beam detecting means which is obtained by scanning the electron beam on the object;

arithmetic operation means for calculating a sensitivity distribution f(x,y) representing an intensity of the interaction between the object and the converging electron beam, the object and the converging electron beam having a relationship of convolution integration represented by equation (1)

$$I(x,y) = K \int \int f(x',y') g(x'-x, y'-y) dx' dy' \quad (1)$$

where K is a constant; and display means for displaying a sensitivity distribution image output from said arithmetic operation means.

11. A microscoping apparatus for radiating a converging wave onto an object and obtaining a sensitivity distribution representing an intensity of interaction between the object and the converging wave, comprising:

a first memory for storing a function g(x,y) representing an intensity distribution of the converging wave at a substantially beam waist section thereof;

scanning means for radiating the converging wave on the object at a substantially beam waist position, and scanning the converging wave on the object;

a detector for detecting an intensity of a secondary wave generated by the interaction between the converging wave and the object in accordance with a scanning operation of said scanning means;

second memory means for storing a positional function I(x,y) representing an intensity distribution of the secondary wave detected by said detector; and an arithmetic unit for obtaining a function f(x,y) such that the function I(x,y) stored in said second memory satisfies convolution integration of the function g(x,y) stored in said first memory and the function f(x,y).

12. A microscoping method comprising the steps of:

radiating onto an object a converging wave having a function g(x,y), which represents an intensity distribution of the wave at a substantially beam waist section thereof, at a substantially a beam waist position of the converging wave, and scanning the converging wave on the object;

obtaining a function I(x,y) representing an intensity distribution of a secondary wave generated by the interaction between the converging wave and the object by the scanning operation; and obtaining a sensitivity distribution representing an intensity of the interaction between the object and the converging wave by obtaining a function f(x,y) in such a manner that the function I(x,y) satisfies convolution integration of a function g(x,y) and the function f(x,y).

* * * * *